Feb. 20, 1968          B. HOWARD                 3,369,508
       SEWING MACHINE ATTACHMENT FOR MAKING MONOGRAMS
                      AND OTHER DESIGNS
Filed Aug. 25, 1965                          6 Sheets-Sheet 1

INVENTOR
BERNARD HOWARD
BY James and Franklin
ATTORNEYS

Feb. 20, 1968  B. HOWARD  3,369,508
SEWING MACHINE ATTACHMENT FOR MAKING MONOGRAMS
AND OTHER DESIGNS
Filed Aug. 25, 1965  6 Sheets-Sheet 5

INVENTOR
BERNARD HOWARD
BY James and Franklin
ATTORNEYS

Feb. 20, 1968  B. HOWARD  3,369,508
SEWING MACHINE ATTACHMENT FOR MAKING MONOGRAMS
AND OTHER DESIGNS
Filed Aug. 25, 1965  6 Sheets-Sheet 6

INVENTOR
BERNARD HOWARD
BY James and Franklin
ATTORNEYS

# United States Patent Office 3,369,508
Patented Feb. 20, 1968

3,369,508
SEWING MACHINE ATTACHMENT FOR MAKING MONOGRAMS AND OTHER DESIGNS
Bernard Howard, Upper Saddle River, N.J., assignor to Mite Corporation, New Haven, Conn., a corporation of Delaware
Filed Aug. 25, 1965, Ser. No. 482,466
37 Claims. (Cl. 112—77)

ABSTRACT OF THE DISCLOSURE

The sewing machine attachment makes monograms and other designs which usually require crossovers. It is mounted on the presser bar and has a base with a slide therebeneath carrying a large foot frame at its forward end enclosing a large work area, say a two inch square. The slide has a longitudinal slot in its rear end receiving a fixed pivot on the base, and affording polar motions (arcuate X and radial Y motions). The pattern cam is an elongated flat bar having edge teeth for feed, and having smooth continuous top and bottom cam tracks which each may utilize nearly the full width of the bar, and which may cross one another. The cam follower of one of the cam tracks operates linkage extending to a longitudinal slot at the forward end of the slide for producing arcuate X motion, and another cam follower for the other cam track operates linkage extending to a cross slot in the slide for producing radial Y motion. A needle bar fork operates pawl and ratchet mechanism to feed the pattern cam through the attachment. Preferably there is symmetrical gearing meshing with teeth on both edges of the cam bar. A release lever permits reverse movement of the cam bar, and the latter is polarized against improper insertion in the attachment. Although the foot frame has sides parallel and perpendicular to the longitudinal axis of the bed and head of the sewing machine, i.e., facing the operator squarely, the cam bar when viewed in plan is disposed at an angle in order to clear the pedestal of the head regardless of the length of the cam bar. A transparent guide facilitates proper location of the monogram on the material being sewn. When used with a non-zigzag sewing machine, the attachment has a cam to produce a zigzag motion which is combined with the X motion. The cam bar then is preferably provided with a third cam track and follower to automatically vary the bight of the zigzag stitch, in relation to the pattern, but without varying the main X and Y motions. A manual adjustment may be provided to vary the range of the automatic bight variation produced by the third cam track.

---

This invention relates to sewing machines, and more particularly to an attachment for making monograms and other designs.

The general object of the invention is to improve machine sewing, and more particularly to provide a compact inexpensive and easily used attachment for making monograms, buttonholes, words, pictures, and other designs. The lines of stitching can cross repeatedly, thus making it possible to produce intricate and fancy designs. For this purpose the fabric is moved by a relatively large foot in the form of a hollow frame, and the foot is given a lateral or X motion and a longitudinal or Y motion produced by two appropriately coordinated cam tracks on a single cam.

In accordance with a further feature and object, the design within the foot is not limited in length, and the pattern cam is made in the form of an elongated flat bar which is made longer when the design is longer. The bar when viewed in plan, is held and moved at an angle so selected that it will clear the head and motor of the sewing machine, and thus may be made quite long when such length is needed for the design.

In accordance with an ancillary object the pattern cam bar is so shaped that it is polarized and cannot be inserted in the attachment incorrectly; the attachment is provided with a manually operable knob to feed the pattern cam to a designated starting point, preferably indicated by a pointer and mark; and the attachment is provided with a release lever making it possible to move the pattern cam in reverse direction should it be necessary to back the same a short distance before completion of the pattern, because of thread breakage.

When the sewing machine is not a zigzag machine the stitch employed is a zigzag stitch, produced by the attachment itself, and the zigzag motion is combined with or superposed on the pattern movement of the foot. For freedom in design the width or bight of the zigzag stitch is automatically varied, and for this purpose the pattern cam bar is provided with a third cam track. Moreover, in accordance with a further feature and object, the range of the stitch variation or bight may be varied by manual adjustment.

Still another feature is the provision of a hold-down finger immediately adjacent the needle to hold the fabric as the needle is retracted. The pressure of the hold-down finger is relieved during each stitch cycle in order not to interfere with the desired movement of the fabric by the foot frame.

To accomplish the foregoing objects and additional objects which will hereinafter appear, my invention resides in the sewing machine elements and their relation one to another as are hereinafter more particularly described in the following specification. The specification is accompanied by drawings in which:

Figures 1, 2, 3, 4:
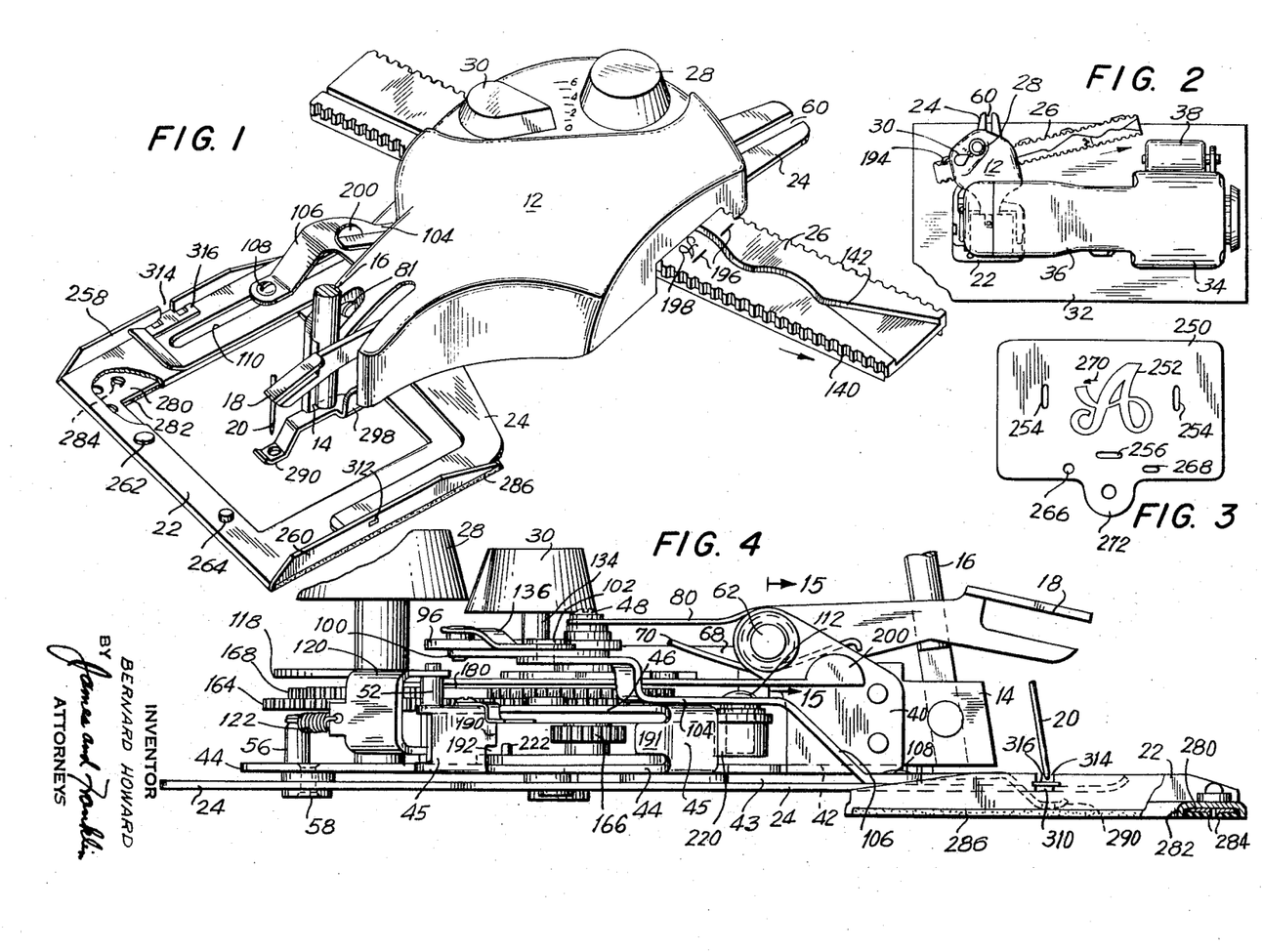
FIG. 1 is a perspective view showing the attachment with a pattern cam therein.
FIG. 2 is a plan view drawn to small scale to show the relation of the attachment and its pattern cam to the sewing machine.
FIG. 3 shows a thin transparent locating guide which helps properly locate the monogram on the fabric.
FIG. 4 is a side elevation of the attachment looking toward the left or far side of FIG. 1.

Referring to the drawing and more particularly to FIG. 1, the improvement is illustrated in preferred form as an attachment comprising mechanism covered by means of a removable cover 12. It is secured to the sewing machine by an adapter 14 which is mounted on the presser bar 16 of the sewing machine, and it is actuated by means of a fork arm 18 which straddles the clamp screw of the needle bar (not shown) which carries the sewing machine needle 20. The fabric is held and moved by a foot in the form of a relatively large open frame 22, this being carried and moved by the bifurcated forward end of a slide 24 located at the bottom of the attachment.

The slide is given both lateral and longitudinal movements, sometimes referred to as X and Y movements respectively, by means of a pattern cam, preferably in the form of an elongated flat bar 26 which is fed through the attachment from left to right as the sewing operation proceeds. A manually operable knob 28 may be used to preliminarily feed the pattern cam 26 when first inserting it in the attachment. Another knob 30, preferably a pointer knob, cooperates with a scale as shown, to vary the range of zigzag width or bight, the proportional variation being provided automatically by means of a third cam track on the pattern cam 26.

Referring now to FIG. 2 of the drawing, a sewing machine is schematically represented by a base 32 carrying a head 34 with the usual overhanging arm 36. The machine is driven by a motor indicated at 38. The present attachment is shown at 12, with a pattern cam 26 which has already been fed nearly all the way through the attachment. It will be noted that the pattern cam 26 is disposed at an angle such that its path of movement clears the sewing machine head 34 and the motor 38 regardless of the length of the pattern cam. This is important when the design is intricate and requires a long cam which otherwise could not be accommodated.

Figure 5:
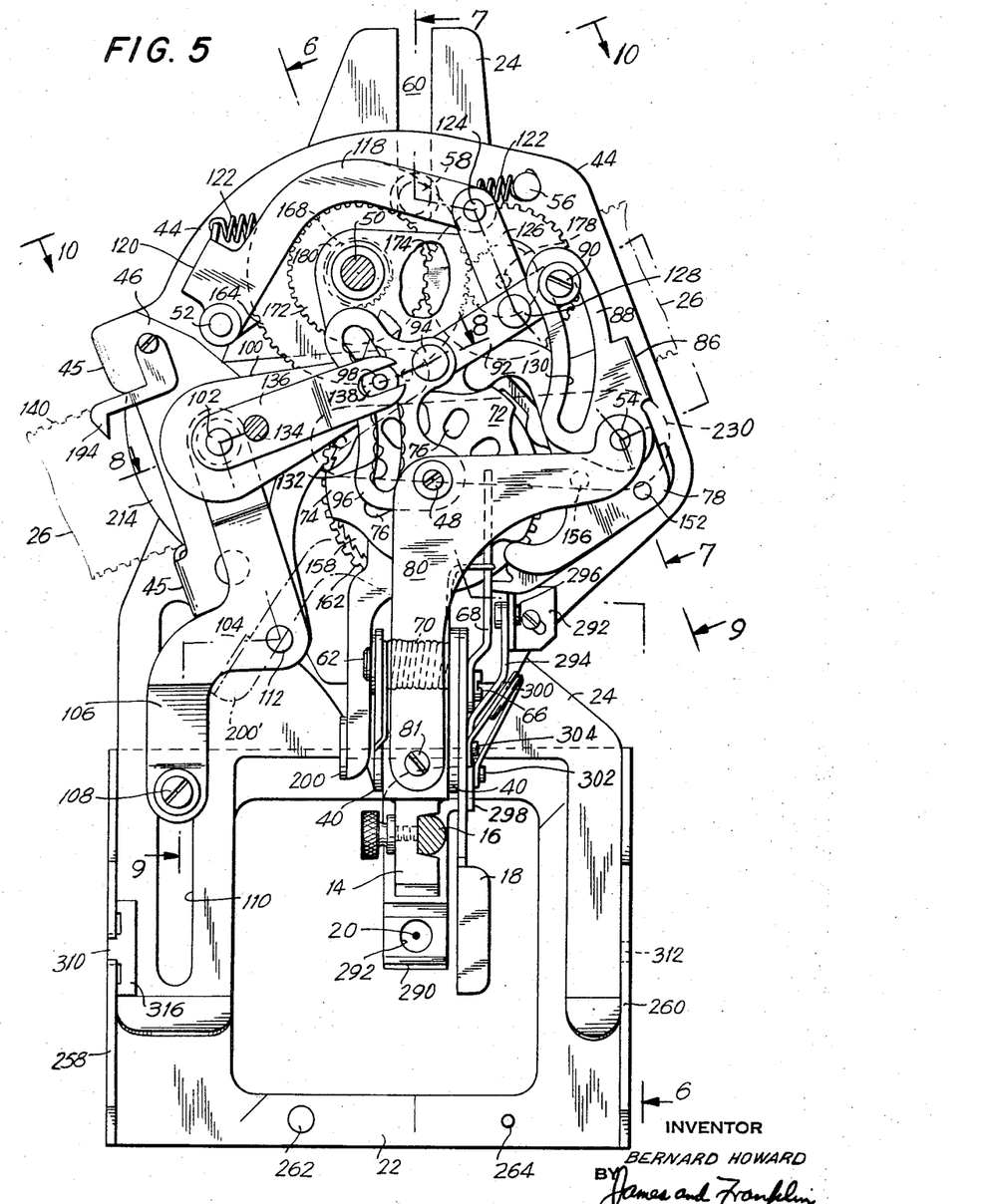
FIG. 5 is a plan view of the attachment with the cover removed to expose the mechanism therebeneath.
Figure 10:
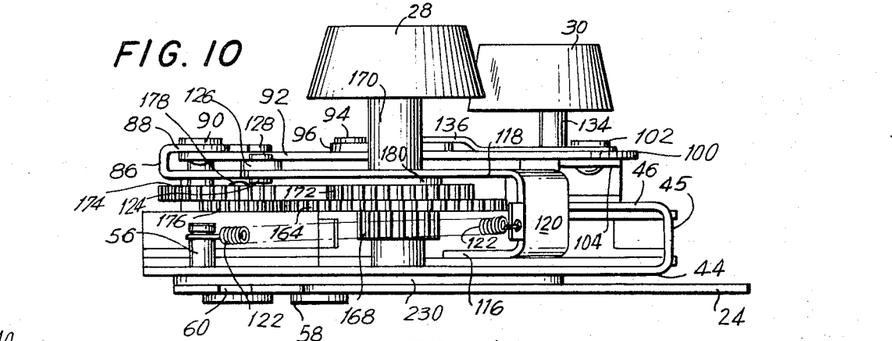
FIG. 10 is a rear elevation looking in the direction of the arrows 10—10 of FIG. 5.
Figures 18, 19:
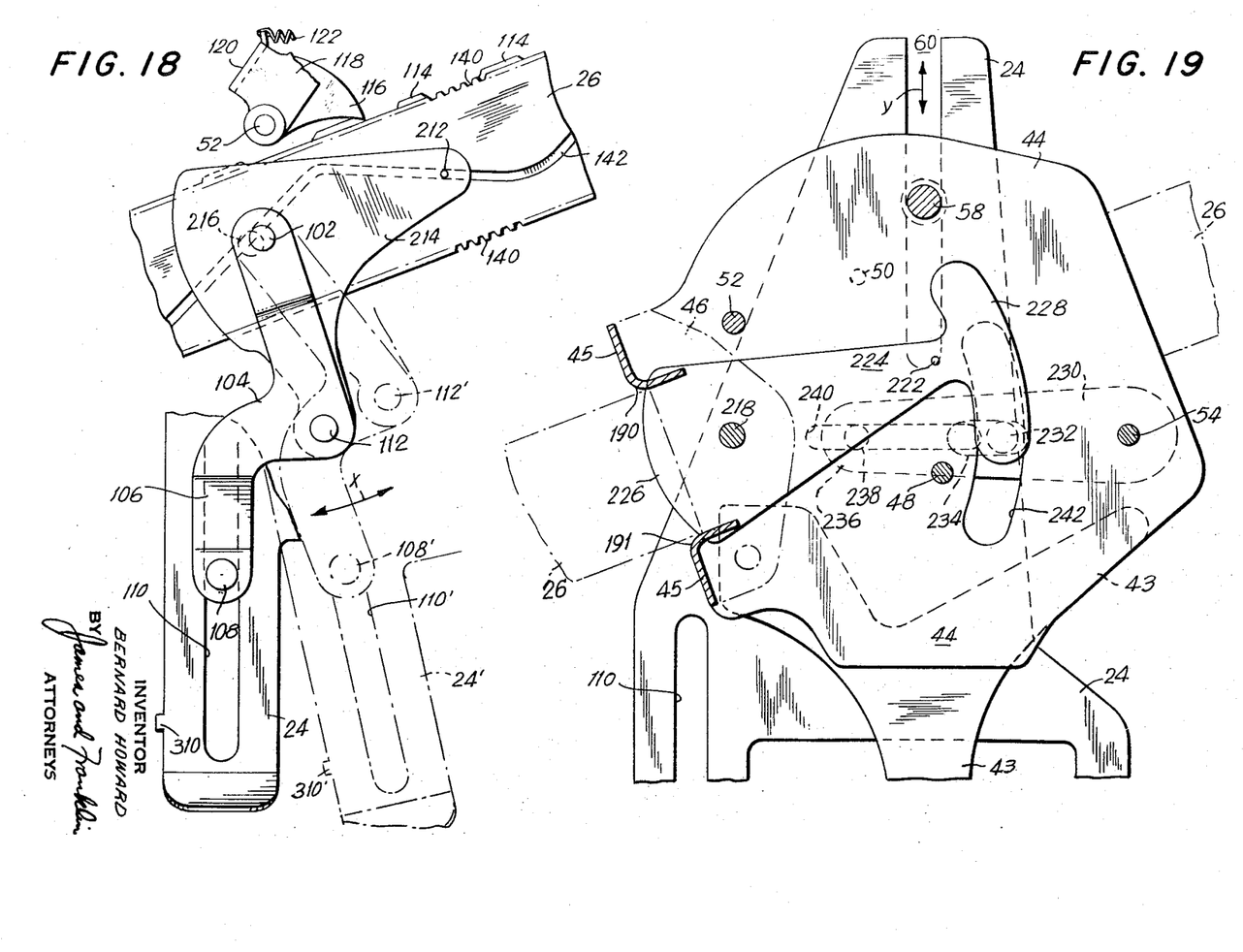
FIG. 18 is a plan view explanatory of the linkage for producing the lateral or X movement.
FIG. 19 is a plan view explanatory of the linkage for producing the longitudinal or Y movement.

Referring now to FIGS. 4, 5, 6 and 15, the adapter 14 may be a die cast block which is secured rigidly between and projects forwardly from upstanding bearings 40, which are folded upwardly from a peice 42 which is welded to a piece 43 welded beneath the forward end of the main base plate 44. The configuration of the main base plate 44 and the spacer extension 43 are shown in FIG. 19. At the left side the base plate 44 is folded upwardly at 45 and inwardly as indicated in broken lines at 46, for additional bearing support. This fold is also shown at 44, 45 and 46 in FIG. 10, which looks toward the rear of the attachment. These parts are also shown in FIG. 5.

The fixed base 44 has a number of posts secured thereto and projecting upwardly therefrom, such posts being indicated at 48, 50, 52, 54 and 56 in FIG. 5. Two of the posts, in this case the posts 48 and 54, are additionally stiffened by means of a fixed top plate 80 which in this case is L shaped, and the forward end of which is secured to the adapter block 14 by means of a screw 81. In FIG. 5 the cover has been removed, but referring to FIG. 1, the cover 12 is held in position by the same screw 81.

The base 44 (FIG. 5) also has a fixed but downwardly projecting pivot 58 which is received in a long slot 60 in the rear end of the slide 24, this slot being shown in FIGS. 1, 2, 5 and 19. The slide turns on pivot 58 for its lateral or X movement, and slides on pivot 58 for its longitudinal or Y movement. The movements are arcuate rather than rectilinear, but the design of the cam tracks allows for this, and the motions are more conveniently obtained and with less friction than when using a complex mounting which seeks to provide true rectilinear motions.

The adapter is here assumed to be used on a standard slant needle sewing machine for home use, but in most cases the presser bar and needle bar are vertical. As illustrated, the frame 22 of the foot has an open or useful area of say two inches by two inches. The attachment is useful on industrial as well as home sewing machines. Also, for industrial purposes a special sewing machine may be made, having some features of the present invention built in.

THE ZIGZAG MOTION

Figure 6:
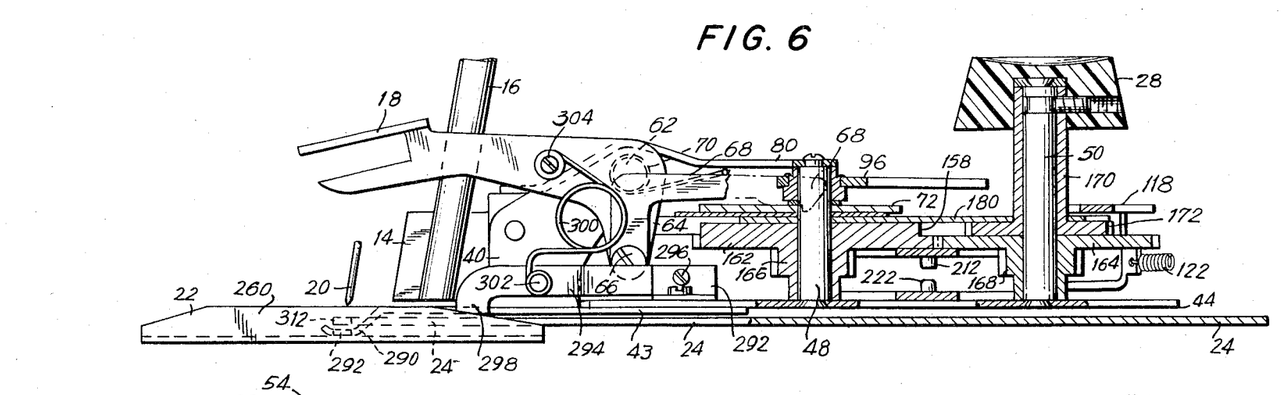
FIG. 6 is a partially sectioned vertical elevation taken on the stepped line 6—6 of FIG. 5.
Figures 16, 17, 20, 21:
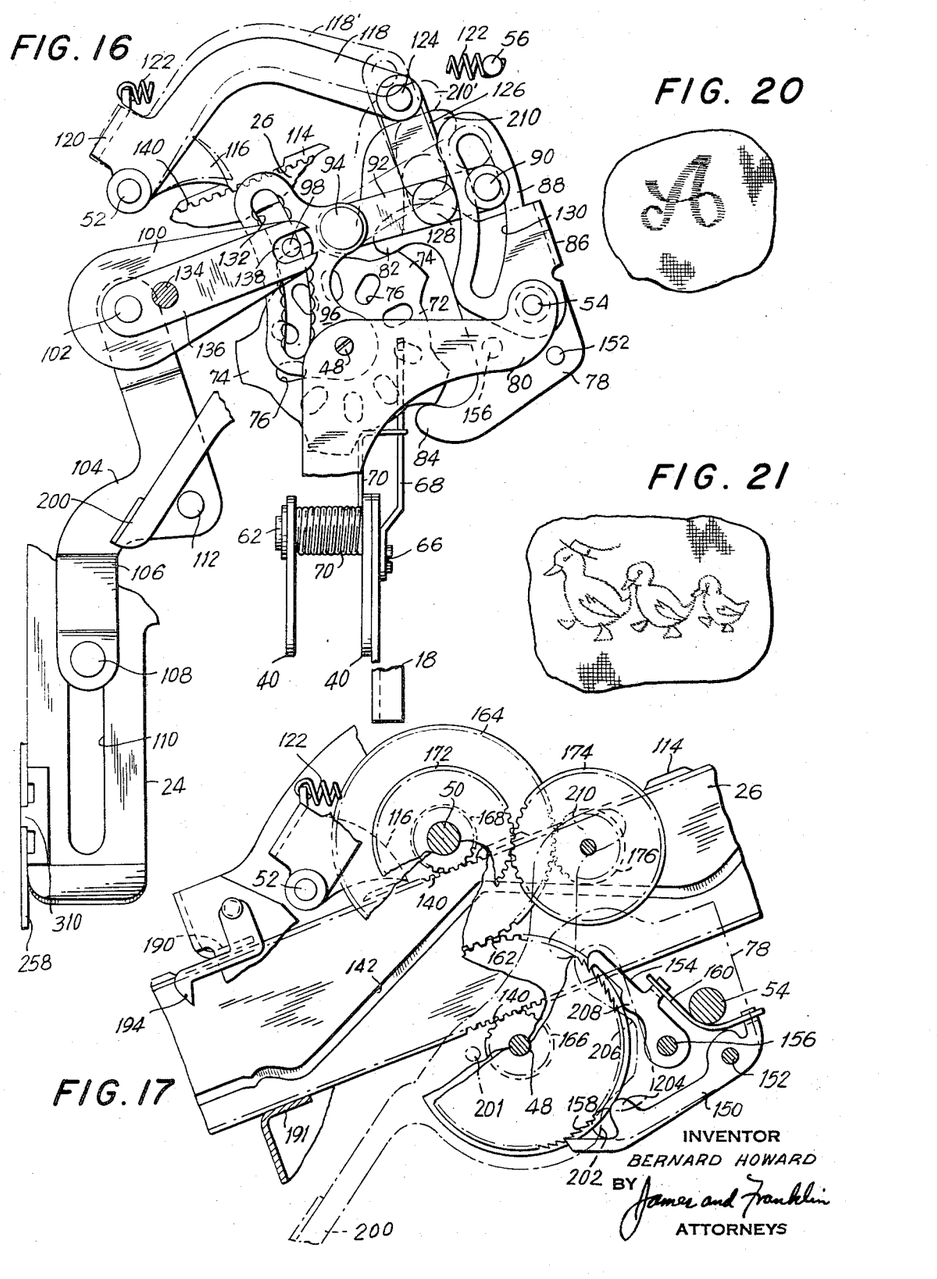
FIG. 16 is a plan view explanatory of the linkage for driving the attachment and for producing the zigzag stitch.
FIG. 17 is a plan view explanatory of the mechanism for feeding the pattern cam.
FIG. 20 shows one possible form of the letter A, typical of an alphabet of script letters which may be produced by the attachment.
FIG. 21 shows a pictorial design which may be produced by the attachment, as an example.

Referring to FIGS. 5, 6 and 16, the fork arm 18 is pivoted at 62 in the upstanding bearings 40 (previously referred to as being riveted to the adapter block 14). The fork 18 is an angle lever having a depending arm 64 (FIG. 6) which is pivoted at 66 to a generally horizontal pawl 68, the latter being somewhat L-shaped in order to reach down to the pivot 66. The pawl hook is urged downward by a spring 70 coiled around the pivot 62.

The pawl 68 drives a lobed cam 72 which is pivoted on vertical post 48, the cam being in a horizontal plane. The cam is most clearly shown in FIG. 16, and in this case has five lobes 74, and ten slots or apertures 76 which receive the depending tooth of pawl 68. Each reciprocation of the fork 18 moves the lobed cam one tenth of a revolution.

The cam follower is somewhat like the pawl of an escapement, it being a rocker 78 pivoted on post 54 and having two rounded and hardened tips 82 (FIG. 16) and 84 which straddle the lobed cam to provide a positive motion in both directions, it being understood that the spacing of the tips 82 and 84 is such that when one is on a lobe the other is in the cam drop between lobes.

The rocker 78 is folded upwardly at 86 and inwardly at 88 and is pivoted at 90 to a link 92. This is connected at 94 to a second rocker 96 which is pivoted on post 48 and which is connected at a pin 98 to a link 100 which is pivoted at 102 to one end of a combining lever 104. The other end of lever 104 is bent downward at 106 to a pivot 108 which is slidable in a slot 110 extending longitudinally of the slide 24. More specifically slot 110 is in one of the spaced arms of the slide which carry the foot frame (22 in FIG. 5). The lever 104 is pivoted at 112, which for the moment may be considered to be a stationary pivot (although in practice it is movable and combines the pattern movement with the zigzag movement).

It will be understood that there are ten pawl teeth or holes 76 for the five lobes 74 because each complete zigzag stitch requires a right-hand reciprocation of the needle and a left-hand reciprocation of the needle. As so far described the width or bight of the zigzag would be constant, and for that purpose a single link could extend all the way from the cam follower rocker 78 directly to the lever 104. However, for artistic lettering and designs the bight is preferably varied, as will be seen for example in FIG. 20, and this variation must be coordinated with the pattern. FIG. 18 shows an edge cam track 114 which is engaged by a cam follower 116 pivoted on post 52. FIG. 16 also shows the said cam follower 116 pivoted at 52, and formed integrally with a cam follower arm 118. The parts 116 and 118 are made of one piece of heavy gauge sheet metal folded upward and over at 120, the part 120 being substantial in height as will be seen in FIG. 10. The cam follower 116 is urged against the cam by means of a pull spring 122 the remote end of which is anchored on a post 56 (FIGS. 5, 10, and 16) fixed on base 44.

The cam follower arm 118 (FIGS. 5 and 16) is connected at 124 to a short transverse link 126 the other end of which is connected by means of a pivot 128 to the link 92, thus serving to shift the link 92 laterally. The rocker 88 is arcuately slotted at 130, in a direction generally transverse of the link 92, and the pin 90 is slidable in the slot 130, thus changing the effective radius of the rocker 78 between its fixed pivot 54 and the pin 90. This of course varies the zigzag bight, and the linkage is so arranged that the variation extends all the way from substantially zero when pin 90 is at the near end of slot 130, to a desired maximum, in this particular case 3/16 of an inch, when pin 90 is at the remote end of the slot 130.

As so far described the shiftable link 92 could extend directly all the way to the pivot 102. Such an arrangement is entirely feasible and would be usable, but in the present mechanism there is an additional manual control which varies the range of bight variation.

For this purpose a second rocker 96 is provided, this being slotted in a direction generally transverse to the link 100, as is indicated at 132. The right end of the link 100 is shiftable along the slot 132 to vary the effective radius between the fixed pivot post 48 of rocker 96, and the connection 98 between the link 100 and the rocker 96. This shift is caused manually by rotation of the pointed knob 30 previously referred to and shown in FIGS. 1, 4 and 10. The knob 30 is mounted at the upper end of a short stud 134 fixedly secured to the link 100. Theoretically the stud 134 should be at the center 102, but it is more convenient to rivet it in slightly offset position, and in practice it is found that rotation of the pointer knob 30 shifts the link 100 nearly as readily as though located at 102.

With the refinement of this manual adjustment, the cam track 114 on the pattern cam provides changes ranging between zero and 3/16 inch, and the range knob reduces the range. For example, at half range the bight would vary from zero to 3/32 inch, instead of from zero to 3/16 inch.

To hold the manual adjustment, a suitable detent is provided. In the present case the top edges of the slot 132 are conically notched or recessed at short intervals, and a leaf spring 136 is secured at 102, with its free bifurcated end bearing downward on top of a small cone-shaped detent 138. This is best shown in FIG. 9, in which the spring 136 bears downward on cone shaped detent 138 and thus holds the shiftable link 100 in desired position.

FIG. 1 shows how the pointed knob 30 cooperates with a scale on the cover 12. In this case the scale goes from zero to six, and corresponds to the bight range in intervals of one thirty-second of an inch.

Figures 7, 8, 9:
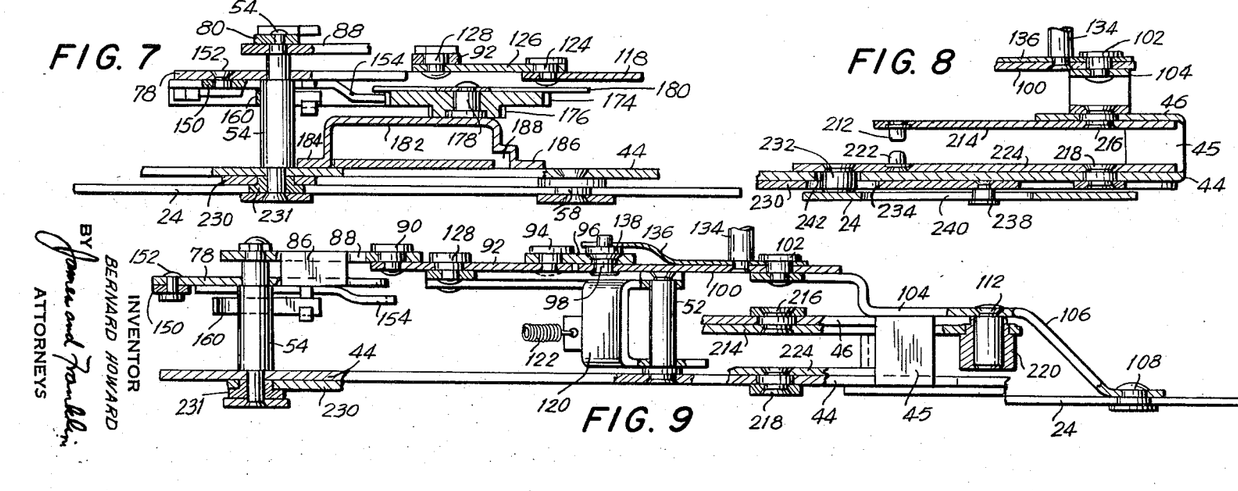
FIG. 7 is a vertical section taken on the stepped line 7—7 of FIG. 5.
FIG. 8 is a fragmentary vertical section taken on the line 8—8 of FIG. 5.
FIG. 9 is a vertical section taken on the reversely folded line 9—9 of FIG. 5.

Referring now to FIG. 8 it is significant to note that the link 100 with its pin 134 for the pointer knob and its detent spring 136 are connected at 102 to the combining lever 104 at a level higher than, and separate from two subjacent fixed pivots 216 and 218. Pivot 216 forms a part of the lateral or X linkage to be described later. Pivot 218 forms a part of the longitudinal or Y linkage. The parts 134 and 102 anchor the spring 136.

PATTERN CAM AND ITS FEED

Figures 11, 12, 13:
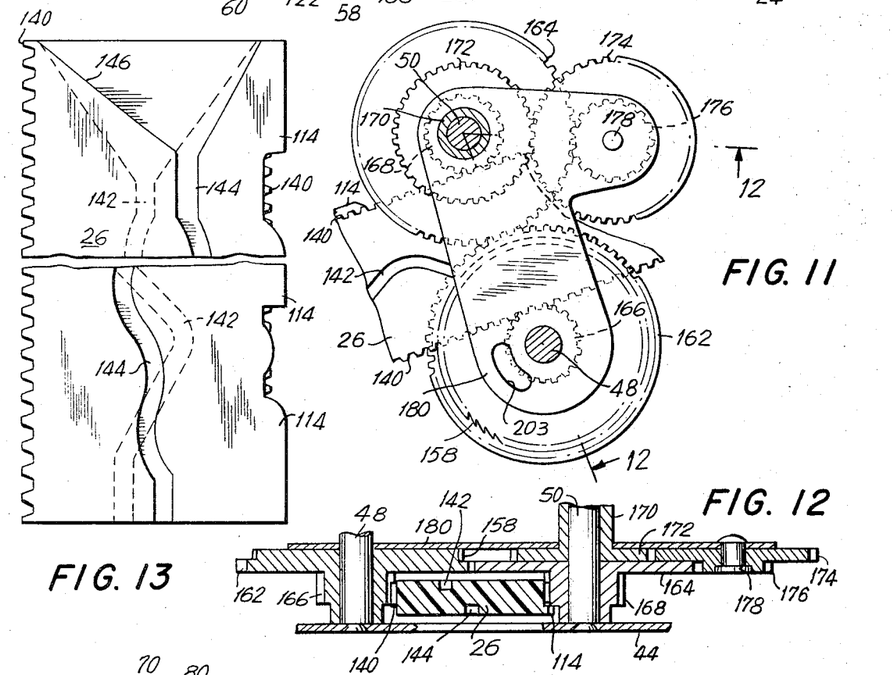
FIG. 11 is a fragmentary plan view showing the gear arrangement for feeding the pattern cam.
FIG. 12 is a fragmentary vertical section taken on the bent line 12—12 of FIG. 11.
FIG. 13 is a bottom plan view showing the ends of a pattern cam, the main middle portion being omitted.
Figures 14, 15:
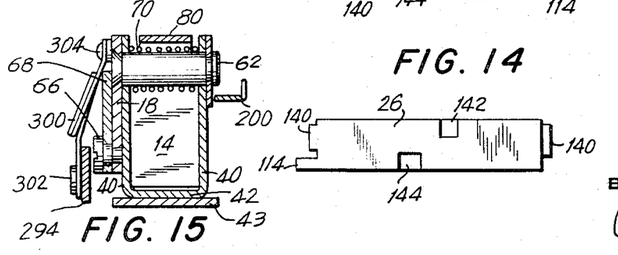
FIG. 14 is an end view of the patern cam.
FIG. 15 is a fragmentary vertical section taken on the line 15—15 of FIG. 4.

The pattern cam 26 is shown in FIGS. 13 and 14, the former being a bottom view. When made in quantity the pattern cam is preferably molded out of a suitable plastics material, in order to reduce weight and expense. It takes the form of an elongated flat bar having edge teeth 140, preferably on both edges. It has a top cam groove 142, which in this case produces the lateral or X motion, and it has a bottom cam groove 144 which then produces the longitudinal or Y motion. A position midway between the gear racks may correspond to a frame position with the needle in the middle of the frame. As shown in FIG. 13 the grooves 142 and 144 start with a wide convergent mouth 146 which facilitates insertion of the pattern cam, regardless of the last position and the new desired starting position, of the cam followers.

The feed of the pattern cam 26 may be described with reference to FIGS. 16 and 17. It will be recalled that fork 18 moves pawl 68 which drives the lobed cam 72 which in turn rocks the positive cam follower rocker 78. The lower side of rocker 78 carries pawls engaging a ratchet wheel for feeding the pattern cam, and referring now to FIG. 17, in the present case the rocker 78 carries a push pawl 150 pivoted at 152, and a pull pawl 154 pivoted at 156. These pawls engage a ratchet wheel 158 which is rotatable on the fixed post 48 previously referred to, and on which the lobed cam is also rotatable, but they are not attached to one another, and indeed are here separated by a buffer plate 180 (FIGS. 6, 11, and 12). The pawls are urged inward by means of a spring 160 (FIG. 17).

Ratchet wheel 158 is formed integrally with a subjacent gear 162 large enough to mesh with an equal diameter gear 164 pivoted on post 50 on the opposite side of the pattern cam 26. Gear 162 is formed integrally also with a subjacent pinion 166 (FIG. 12) which meshes with the rack teeth 140 (FIG. 17) on side of the pattern cam. Similarly gear 164 is formed integrally with a subjacent pinion 168 which meshes with the rack teeth 140 on the other side of the pattern cam. It will be evident that this provides a symmetrical or double feed, which is preferred and advantageous even if not essential.

It is helpful to provide for manual feed, particularly when first inserting a pattern cam, and for this purpose the manually operable knob 28 (FIGS. 1, 4, 6, 10) is provided. This could be mounted directly on the gear 164, but in practice it has been found desirable to provide a gear reduction in order to make the knob more readily rotatable. Referring to FIG. 6, the knob 28 is above the gear 164, but it is secured to a tubular shaft or hub 170 of a gear 172 which is rotatable on the fixed post 50, and which is free of the gear 164.

Referring now to FIGS. 11, 12 and 17, gear 172 meshes with an offset idler gear 174. This is a compound gear formed integrally with a pinion 176, and the latter meshes with the main gear 164. The compound idler 174, 176 is pivoted at 178 beneath a buffer plate 180 which overlies the gears, as will be seen in FIG. 12, and also in FIG. 6. One part of the buffer plate separates the main lobed zigzag cam 72 (FIG. 6) from the pattern feed ratchet wheel 158 and its integral gear 162. Another part carries the compound idler gear 174, 176.

It will be seen that the manual feed knob 28 rotates the paired large gears 164, 162, and with them they rotate pinions 168, 166, and so feed the pattern cam, with a gear reduction arising from the fact that a relatively small idler pinion 176 meshes with the large diameter gear 164.

Referring to FIG. 14, the bight cam track 114 is located at one edge near one face of the cam bar, and this affords its additional utilization to insure proper insertion of the pattern cam. The pattern cam is appropriately guided at both sides of the attachment, and referring to FIG. 7 there is a guide 182 which is welded at 184 and 186 to the fixed base 44. This guide has an offset opening 188 at one side to mate with and to accommodate the bight cam track.

There is a similar mating fit at the intake side of the attachment. Referring to FIG. 19 it will be recalled that fixed base 44 is turned upward at 45 and inward at 46 at a higher level above the pattern cam. Parts 190 and 191 form a mouth to receive the pattern cam. FIG. 4 also shows how base 44 is turned up at 45 and inward at 46, and it further shows the convergent guide 190, 191, for the pattern cam. The right guide 191 extends all the way down, whereas the left guide 190 stops short, leaving a recess 192 to receive the bight cam track. It will be understood that if the pattern cam is reversed end for end or if it is turned over top for bottom, it cannot be inserted in the attachment, thus properly polarizing the cam as it is inserted.

The bight cam track projection is preferably provided at the starting end of the pattern cam bar, so that the polarization is effective immediately on insertion of the bar, and for the same reason a similar bight cam projection is preferably provided at the trailing end of the pattern cam bar, even though not needed for zigzag purposes, this being at a point beyond the termination of the useful pattern portion of the cam bar. To insure preliminary insertion of the pattern cam to its correct starting position, it preferably is provided with a start mark, and the attachment is provided with a pointer to which the start mark is moved. Referring to FIG. 5 the pointer is shown at 194 and it is disposed at the mouth outside the cover of the attachment. It is also shown in FIGS. 2 and 17. In FIG. 1 the pattern bar has already moved for a substantial distance, and the start mark has passed the cover 12 and is visible at 196. The pattern cam preferably carries a character 198 corresponding to that which is produced by the pattern cam, in this case a script A.

In rare cases, as for example if the thread breaks and it is necessary to rethread the machine, it may be desired to back the pattern cam a short distance in reverse direction. If reverse movement is desired, it is necessary to first release the feed pawls 150 and 154 (FIG. 17). It is also desirable to release the bight cam follower 116 because the drops in the bight cam may be abrupt and may inhibit reverse movement. For this purpose there is a release lever 200 shown in its outer or normal position in FIGS. 16 and 17. In FIG. 5 it is shown in its outer position 200' in broken lines, and in its inner or release position 200 in solid lines. Referring to FIG. 17 the release lever 200 is pivoted on post 48. It is enlarged and has a cam rise at 202 which is adapted to bear against a cam follower 204 formed integrally with the push pawl 150. It has another cam rise 206 adapted to bear against a cam follower 208 formed integrally with the pull pawl 154. It is extended rearwardly to provide a third cam rise 210 which is suitably located to bear against the bight cam linkage to move the same outwardly. This relation is better shown in FIG. 16, the release lever being moved from the solid line position 210 to the broken line position 210', thereby moving the bight cam follower arm 118 to the broken line position 118'.

The release lever is preferably provided with motion limiting means. In the present case it has a lug 201 (FIG. 17) which rides in an arcuate slot 203 (FIG. 11) in the buffer plate 180, and this limits its motion.

THE LATERAL OR X MOTION

Referring to FIG. 18, the top cam groove 142 of the pattern cam 26 receives a cam follower pin 212 projecting downward from an angle lever 214 pivoted on a fixed pivot located at 216. This pivot is not to be confused with the pivot 102 of the combining lever 104 previously referred to in connection with the zigzag motion. The pivot 216 is a fixed pivot, and at times the movable pivot 102 is located over the pivot 216. It will be recalled in connection with FIG. 19 that the fixed base 44 is folded over at a higher level at 46, this higher level being above the pattern cam, and pivot 216 is carried by the inwardly folded part 46 of the base. It need not be but it is conveniently located directly over the center axis of the pattern cam and its groove, and over another fixed pivot 218 (FIG. 19) which is carried by the base 44 and which is located below the pattern cam bar. For ease in designing the cam tracks for symmetrical movement either side of center, the fixed pivots 216 and 218 are preferably located half way across the width of the pattern cam. They are shown also in FIG. 8.

Reverting to FIG. 18 the cam follower 214 is an angle lever, pivoted at 216, and carrying a connection pivot 112 for the combining lever 104. FIG. 9 shows how the base 44 is turned upward at 45 and inward at 46 to carry pivot 216 for the cam follower lever 214, and how the end of this angle lever is reinforced with a bearing 220 carrying the pin 112 which connects it to the combining lever 104. FIG. 9 also shows the bottom follower 224 pivoted at 218. The pattern cam bar slides between the two followers.

Reverting to FIG. 18, the pattern cam groove 142 may move pivot 112 to the broken line position 112' thereby moving the pin 108 to the broken line position 108', and so moving the slide 24 to the broken line position 24'. It is capable of an equal movement in opposite direction, thus providing the lateral or X movement.

This pattern movement is combined by the combining lever 104 with the zigzag stitch movement which was described with reference to FIG. 16, and which was applied to the pin 102 at the end of the combining lever 104. For the zigzag motion the pin 102 is movable and the pin 112 is relatively fixed, whereas for the lateral or X movement the pivot 112 is movable and the pivot 102 is relatively fixed. The two movements are superposed or combined at the pin 108, and so are applied to the slide 24 and consequently to the foot frame. Although the X motion is arcuate rather than rectilinear, the design of the cam track 142 allows for this, and the correct pattern is reproduced.

THE LONGITUDINAL OR Y MOTION

The mechanism for producing the longitudinal or Y motion may be described with reference to FIG. 19, which illustrates parts that are located below the pattern cam. It will be recalled with reference to FIG. 14 that the Y motion is obtained from a cam groove 144 formed in the bottom of the pattern cam bar. The cam groove receives a cam follower pin 222 (FIG. 19) projecting upwardly from a cam follower arm 224 pivoted on a fixed pivot 218 secured to the base 44. The arm 224 directly underlies the pattern cam and therefore is made quite wide at 226, and is again widened at its movable end as shown at 228, to steady it and the pattern cam.

Its motion is multiplied by a multiplier lever 230 pivoted on post 54. The follower arm 224 is connected to the multiplier lever 230 by means of a pin 232 projecting downward into a slot 234 in the arm 230, which slot accommodates the angularity. The movable end 236 of multiplier lever 230 has a pin 238 which is received in a transverse or lateral slot 240 formed directly in the main slide 24. It will be recalled that the slide 24 is located beneath the base 44, and in the present mechanism the arm 230 is located beneath the base and between the base 44 and the slide 24. In such case the pin 232 passes through an arcuate slot 242 in the base 44, in order to reach the multiplier lever 230 below the base.

FIG. 9 shows how arm 230 pivots on a spacer washer 231 beneath base 44.

FIG. 8 shows the base 44 turned upward at 45 and inward at 46. The part 46 carries the fixed pivot 216 for the X cam follower arm 214 with its cam follower 212. The Y cam follower pin 222 is carried on cam follower arm 224 pivoted at 218 on base 44. It further shows how the pin 232 of arm 224 passes downward through slot 228 in base 44, to reach the multiplier lever 230 beneath the base.

It will be seen that the Y motion is applied directly to the slide 24, and that there is no need to complicate the linkage by combining it with zigzag motion because in the present device the zigzag motion is assumed to be in the usual horizontal or X direction. The zigzag motion therefore is combined with the X component of the pattern, and not with the Y component.

THE TRANSPARENT LOCATING GUIDE

Referring to FIG. 3, each pattern cam is preferably accompanied by a thin transparent guide 250 on which the character or design to be produced by the pattern cam is indicated in correct size and location. For example in this case a script A is shown at 252. The guide 250 is made of a suitable thin flexible sheet plastics material, and has two vertical marking slots 254 and a horizontal marking slot 256. The guide helps accurately locate the monogram on the material, for which purpose it is first placed on the material and three light pencil lines are made through the slots. The slots correspond to the inner edges of the foot frame 22 shown in FIGS. 1 and 5, and thus the material may be placed in the sewing machine beneath the foot frame, with the vertical lines at the side edges of the frame, and the horizontal line at the bottom edge of the frame. The design then will be reproduced in correct location.

Another procedure is to place the guide 250 in the foot frame between its side flanges 258 and 260. To help accurately locate the same the foot frame is provided with studs 262 (FIGS. 1 and 5) and 264 which differ in diameter. The guide (FIG. 3) has mating holes 266 and 268, thus accurately locating it in the foot frame. The material is moved about beneath the foot frame until the design is located as desired, whereupon the guide is removed.

A small arrow may be provided on the guide, as indicated at 270, to indicate the starting point of the needle when reproducing the particular design. The part 272 acts as a handle, and may be provided with a hole 274 to join a number of guides on a chain or ring.

The guide is additionally useful for a number of purposes. If a shade line stitch is wanted, a darker thread may be used, and the monogram then is repeated, with a slight offset, and usually with a narrower bight range, to shade the character or design previously stitched. The plastic guide is placed in the foot frame over the design as first stitched, in order to properly locate the material to next repeat the design with the desired shadow offset.

Another situation is when the operator has separate pattern cam bars for separate letters, and wishes to stitch several successive letters to form a monogram, instead of having a specially designed longer pattern cam for the complete monogram. In such case the transparent guide 250 for the second letter is placed in the foot, and the material is moved until the first letter is properly related to the second letter which has yet to be stitched. The guide is then removed and the second letter is stitched.

A somewhat similar situation arises when using a pattern cam which forms a short piece of border which is to be stitched continuously around the material. One section of border is stitched within the limits of the foot frame. The material is then shifted and properly located to join that section of border with the next section of border, as indicated by the locating guide temporarily placed in the foot frame.

MISCELLANEOUS

The bottom of the foot frame is preferably provided with means to insure movement of the material with the foot. For this purpose teeth could be provided on the frame, but in the present structure it is preferred to make the foot frame 22 out of a light metal such as aluminum. A separate thin steel plate indicated at 280 in FIG. 4 is secured beneath frame 22 within its narrow flanges 282, and the insert 280 has teeth struck downwardly therefrom as indicated at 284. The apertures formed when making the teeth are also suggested at the left corner of the foot in FIG. 1.

In FIG. 1 the material indicated at 286 is a layer of resilient material, for example urethane foam. This does not interfere with the desired action of the teeth 284, but it helps insure release of the teeth when the foot is raised by raising the presser bar 16 in usual fashion.

In ordinary sewing and sewing machine attachments the presser foot is close to the needle and holds the material down as the needle rises. In the present case the relatively large open area of the foot frame around the needle may permit the material to rise somewhat with the needle, and if desired a hold down finger may be added to prevent this. Such a hold down finger is shown at 290 in FIGS. 1, 4 and 5. It may be notched, or in this case has an aperture 292 which surrounds the needle 20. Referring to FIGS. 5 and 6 the base 44 has an L-shaped bearing 292 secured thereto, and this carries a forwardly extending arm 294 which is pivoted at 296. At its forward end the arm 294 turns downward and inward at 298 to carry the hold down finger 290. The arm 294 is urged downward by a coil spring 300 the lower end of which is secured to arm 294 at 302, and the upper end of which is secured to the fork 18 at 304. The spring 300 is so dimensioned that the hold down finger 290 is normally held against the material, but at the upper end of the upward movement of the fork 18 the pressure of the hold down finger is relieved. This is desirable so that the hold down finger will not interfere with the desired movement of the material, including the zigzag movement, caused by the foot frame. With the arrangement shown the hold down pressure is relieved during each reciprocation of the needle.

The foot frame is pivoted on the slide 24 so that it will best seat itself on the material. For this purpose the slide 24 (FIGS. 5 and 6) has outwardly projecting lugs 310 and 312. The lug 312 is received in a hole in the upwardly turned flange 260 of the frame, and acts as a trunnion for limited motion. The lug 310 is received in an open slot 314 (FIGS. 1 and 4), and is held in position by means of a thin bowed spring plate 316 which is slid into position in small mating slits extending sideward from slot 314, the spring then taking the position shown in FIGS. 1 and 4. Because of its bowed resilient nature the spring 316 remains in position unless intentionally removed. When removed the frame 22 is readily detached from the slide 24.

Referring to FIG. 1 the cover 12 is held in position by a single screw 81 at its forward end, and by the knobs 28 and 30. The screw 81 is received in the adapter block, as previously described, and referring to FIG. 5 the same screw 81 passes through the fixed L shaped top plate 80 mounted at the top of the posts 48 and 54.

The attachment as here illustrated is to be mounted in a sewing machine of the slant needle type, the slant of the presser bar 16 and the needle 20 being shown in FIGS. 4 and 6. The attachment may be mounted in other sewing machines, the only manufacturing change ordinarily needed being a change in the diecast adapter block 14 which receives the presser bar, and in the fork arm which fits around the clamp screw of the needle bar. The sloping path of the pattern cam shown at 26 in FIG. 2 clears the rear of sewing machines even of the type having an exposed rear motor.

It will be understood that the designs which may be made are universal and are not limited to alphabetical or numerical characters. For example FIG. 21 shows in outline only an amusing line of three ducks.

When using the monogram attachment the regular feed dogs of the sewing machine may be covered by a cover plate, or if retractible, may be retracted, to put the same out of use.

OPERATION AND ADVANTAGES

It is believed that the operation and advantages of my improvement will be apparent from the foregoing detailed description. The proper pattern cam and its corresponding transparent guide are selected. The guide is placed in desired location on the garment or material, and locating marks are made through the slots 254 and 256 shown in FIG. 3. The pattern cam is inserted in the attachment, and the knob 28 is turned until the start mark on the cam (196 in FIG. 1) reaches the start pointer (194 in FIG. 5 and FIG. 17). The range of stitch width or bight is adjusted by means of knob 30. The material is placed in the machine beneath the foot and is moved until the locating marks are properly disposed inside the foot frame. If desired, the transparent guide of FIG. 3 may be placed in the foot and used directly, without first making locating marks.

The sewing operation is then started with no further manipulation required by the operator, the operation being wholly automatic. At the end of the design the cam grooves are straight and there is no further movement of the material. Moreover, the bight cam track is preferably reduced to zero and the operator sees that there is neither movement nor zigzag stitch, the needle simply idling in one place, thus indicating that the design is finished. Removal of the pattern cam may be completed by rotating the knob 28. The presser bar then is raised to free the material beneath the foot frame.

If the design is a continuous border design, or if additional characters are to be stitched, the locating guide for the next character may be placed in the foot frame, and the previously stitched character may be properly located relative to the next character to be made. After lowering the presser bar to hold the material, the guide is removed and the next pattern cam is used to reproduce the desired next character. Also as mentioned above, a single character may be repeated, the guide being used for true superposition if a thickened body of stitching is wanted, or being used for a slight offset if the character is to be shaded by means of a darker stitch.

The device will automatically sew various sizes and shapes of buttonholes, including extremely decorative buttonholes. It will sew monograms and initials. It will sew full names or words suitable for identification and name-taping. It will sew designs and insignia, and by shifting the cloth position after one design has been sewn, will sew extremely complex decorative borders and repeat type patterns. It sews automatically and repeats exactly. It does not require any following or tracing of a pattern by the operator. Its operation is strictly "no hands."

For a decorative border, the cams and characters can be so designed that there is a common starting and finishing point for each segment of the design. Thus, the sewing operation for one cam can be completed, and the sewing operation for the next can be begun, with the assurance that where the stitching leaves off on one, it will pick up without apparent interruption on the next.

The device automatically introduces the necessary zigzag motion, and is suited for use with straight stitch machines. Similarly, it can be used with zigzag machines by disabling the zigzag feature in the sewing machine or in the attachment. Since the attachment performs a variety of operations automatically which are almost impossible of performance on any machine, be it zigzag or straight stitch, it is equally desirable for use with zigzag machines or straight stitch machines. The pattern cam automatically varies the zigzag. The operator may manually set the zigzag width before sewing to establish a range of zigzag width most suitable for the design and the fabric being used.

The pattern cams may provide alphabets in various sizes, from approximately ¼″ to 2″ characters, and in many type styles. Standard decorative patterns appropriate to various activities, such as golf, fishing and bowling, and to various holidays, may be offered. A circular, three character monogram can be had by offering three alphabets: one for the first characters (curve on the left); one for the middle characters (curve on the top and bottom); and one for last characters (curve on the right).

Because the pattern bar is linear, it can be of any desired length, lending itself to more and more complex patterns without any inherent limitation. Further, its design makes it simple to insert, and to polarize against improper insertion.

It will be understood that while I have shown and described my improvement in a preferred form, changes may be made without departing from the scope of the invention, as sought to be described in the following claims. In some claims the recital of X and Y is merely for convenience of reference, and they may be interchangeable.

I claim:

1. A sewing machine attachment for making monograms and other designs requiring crossover, said attachment comprising a presser bar adapter, a base carried thereby, a slide beneath the base, the rear end of said slide having a rear longitudinal slot, the forward end of said slide having a forward longitudinal slot, and the intermediate part of said slide having a cross slot, a foot frame enclosing a work area of substantial dimension carried by the forward end of the slide, a fixed pivot on the base receiving the rear longitudinal slot and thereby mounting the slide and foot frame for arcuate X and radial Y motion, a pattern cam in the form of an elongated flat bar having feed teeth for longitudinal feed of the bar and having smooth continuous top and bottom cam tracks which each may utilize nearly the full width of the bar and which may cross one another, a cam follower engaging one of said tracks and linkage extending from said follower to the forward longitudinal slot for producing arcuate X motion, a cam follower engaging the other cam track and linkage extending from said follower to the cross slot in the slide for producing radial Y motion, a needle bar fork, and feed mechanism operated by said fork and engaging said feed teeth to feed the pattern cam through the attachment past the said cam followers.

2. A sewing machine attachment as defined in claim 1, in which there are feed teeth on both edges of the pattern cam bar, and there is a pawl and ratchet mechanism operated by said needle bar fork, and gearing driven by said ratchet mechanism and meshing with said edge teeth on both edges in order to feed the pattern cam through the attachment past the cam followers.

3. A sewing machine attachment as defined in claim 1, in which the pattern cam has edge teeth along both edges, and in which there is a small gear meshing with the edge teeth on each edge, and in which there is a large gear secured to each of said small gears, said two small gears having like diameters, said two large gears having like diameters and meshing directly with one another to provide equal rotation of the small gears, and in which the said pawl and ratchet mechanism drives one of said large gears.

4. A sewing machine attachment as defined in claim 1, in which the forward end of the slide has two widely spaced arms receiving and carrying the foot frame, and in which the said longitudinal slot in the forward end of the slide for producing the arcuate X motion is formed in one of the said two widely spaced arms, and in which the linkage for producing the X motion includes an angle lever disposed between the cam follower for X motion and the said longitudinal slot in the forward end of the slide.

5. A sewing machine attachment as defined in claim 1, in which the linkage for producing the radial Y motion includes a motion multiplying arm, and in which the cam follower arm is pivotally connected to the said motion multiplying arm and a pin on said multiplying arm received in the said cross slot of the slide.

6. A sewing machine attachment as defined in claim 5, in which the forward end of the slide has two widely spaced arms receiving and carrying the foot frame, and in which the said longitudinal slot in the forward end of the slide for producing the arcuate X motion is formed in one of the said two widely spaced arms, and in which the linkage for producing the X motion includes an angle lever disposed between the cam follower for X motion and the said longitudinal slot, and in which the aforesaid linkage for X motion is disposed above the cam bar, and in which the said linkage for producing the radial Y motion is disposed below the cam bar.

7. A sewing machine attachment as defined in claim 1, for making monograms and other designs, said attachment further comprising a hold down finger the forward end of which is localized at the needle to hold the fabric down as the needle rises, and resilient means operated by said needle bar fork to apply downward pressure on the hold down finger during part of the stitch cycle, and to relieve the pressure of the hold down finger during a part of each stitch cycle in order to free the material to move with the foot frame.

8. A sewing machine attachment for making monograms and other designs as defined in claim 1, in which the foot frame is rectangular and when in mid position has two sides substantially parallel to the longitudinal axis of the bed and head of the sewing machine, and in which there are guides which slidably receive the pattern cam, said guides being so directed that the pattern cam is disposed at such an angle to the longitudinal axis of the bed and head of the sewing machine that the pattern cam clears the pedestal of the head of the sewing machine regardless of the length of the pattern cam.

9. A sewing machine attachment as defined in claim 1 for making monograms and other designs, in which said flat pattern cam bar has a start mark and has a top cam groove for producing X motion and has a bottom cam groove for producing Y motion, said grooves each having a wide convergent mouth for easy entry of a mating cam follower, and in which there is a start pointer on said attachment cooperating with said start mark on the pattern cam, and a manually operable knob on said attachment operatively connected to the said cam bar feed mechanism, in order to facilitate manual feed of the pattern cam to the desired starting point where the said start mark is at the said start pointer.

10. A sewing machine attachment for making monograms and other designs, as defined in claim 1, in which the attachment includes a release lever operatively connected to the cam bar feed mechanism to release the pattern cam from said feed mechanism in order to facilitate reverse movement of the pattern cam when desired.

11. A sewing machine attachment for making monograms and other designs, as defined in claim 1, in which the pattern cam bar has a cross section which is unsymmetrical, and in which the attachment has guides slidably receiving the pattern cam bar, said guides being matingly shaped to receive the pattern cam bar only when said bar is in proper orientation, thereby polarizing the combination against insertion of the pattern cam bar in improper position.

12. A sewing machine attachment as defined in claim 1, further including a thin transparent locating guide on which the pattern which is to be reproduced by a particular pattern cam bar is indicated in proper size and location, said transparent guide having marginal slots corresponding in relative location to the inside edges of the said foot frame, whereby pencil marks may be made through said slots on the material to later help properly locate beneath the foot frame that part of the material which is to receive the monogram.

13. A sewing machine attachment as defined in claim 1 further including a thin transparent locating guide on which the pattern which is to be reproduced by a particular pattern cam bar is indicated in proper size and location, and in which the foot frame has means to receive and locate said transparent guide on said foot frame, whereby said guide may be placed temporarily in the foot frame before beginning the sewing operation in order to assist in properly locating beneath the foot frame that part of the material which is to receive the monogram.

14. A sewing machine attachment as defined in claim 1, further including a thin transparent locating guide on which the pattern which is to be reproduced by a particuluar pattern cam bar is indicated in proper size and location, and in which said frame and said transparent locating guide include mating means to properly locate and to ensure proper orientation of the guide in the frame, whereby said guide may be placed temporarily in the foot frame before beginning the sewing operation in order to assist in properly locating beneath the foot frame that part of the material which is to be sewed, and said guide having marginal slots corresponding to the inside edges of the foot frame, whereby pencil marks may be made through said slots on the material in order to later help properly locate beneath the foot frame that part of the material which is to be sewed.

15. A sewing machine attachment for making monograms and other designs, said attachment being positioned adjacent and rearwardly of the needle and comprising a foot frame enclosing, when in midposition, a large rectangular work area two sides of which are substantially parallel to the longitudinal axis of the bed and head of the sewing machine, means including a pattern cam in the form of an elongated flat bar having cam tracks along the same to move the foot frame for X and Y pattern motion, guides in said attachment slidably receiving the pattern cam therethrough, said guides being so drected that said pattern cam extends along the back side of said sewing machine generally in the longitudinal direction of the bed and head of the sewing machine but is disposed at a small angle to the longitudinal axis of the bed and head of the sewing machine such that the pattern cam clears the pedestal of the head of the sewing machine regardless of the length of the pattern cam.

16. A sewing machine attachment for making monograms and other designs, said attachment comprising a presser bar adapter carrying the attachment, a needle bar fork for driving the attachment, and a pattern bar in the form of an elongated flat bar having a start mark and having a top cam groove for producing X motion and having a bottom cam groove for producing Y motion, said grooves each having a wide covergent mouth for easy entry of a mating cam follower, said pattern cam having edge teeth, and said attachment having feed mechanism engaging said teeth to feed said pattern cam, a start pointer on said attachment cooperating with said start mark on the pattern cam, and a manually operable knob on said attachment and operatively connected to the said cam bar feed mechanism in order to facilitate manual feed of the pattern cam to the desired starting point where the said start mark is at the said start pointer.

17. A sewing machine attachment for making monograms and other designs, as defined in claim 16, in which the attachment includes a release lever operatively connected to the said cam bar feed mechanism to release the pattern cam from said feed mechanism to facilitate reverse movement of the pattern cam when desired.

18. A sewing machine attachment for making monograms and other designs, as defined in claim 16, in which the pattern cam has a bight cam track, feed gearing moving said pattern cam, a ratchet wheel cooperating with pawls to drive said feed gearing, a zigzag cam producing a zigzag stitch, a bight cam follower engaging said bight cam track on the pattern cam to vary the bight of the zigzag stitch, a release lever and means operated by said release lever which releases both the pawls and the bight cam follower to permit reverse movement of the pattern cam.

19. A pattern cam bar for use in a sewing machine for making monograms and other designs, said bar being an elongated flat molded plastics bar having edge teeth by means of which the bar is fed longitudinally, said cam bar having a smooth continuous cam groove in the top face of said bar for producing pattern motion in one direction, and having another smooth continuous cam groove in the bottom face of said bar for producing pattern motion in another direction transverse to the first direction, the entrant end of each cam groove having a wide convergent mouth, and an additional track along the bar and so located as to give the cam bar an unsymmetrical cross section in order to polarize the bar against improper insertion in the sewing machine.

20. A pattern cam bar for use in a sewing machine for making monograms and other designs, said bar being an elongated flat molded plastics bar having gear teeth on both edges by means of which the bar is fed longitudinally, said cam bar having a smooth continuous cam groove in the top face of said bar for producing pattern motion in one direction, and having another smooth continuous cam groove in the bottom face of said bar for producing pattern motion in another direction transverse to the first direction, the entrant end of each cam groove having a wide convergent mouth, said bar having a transverse start mark thereon and further carrying an indication of the design to be produced thereby, and said bar having a track along the bar and so located as to give the cam bar an unsymmetrical cross section in order to polarize the bar against improper insertion in the sewing machine.

21. A sewing machine attachment for making monograms and other designs requiring crossover, with a zigzag stitch of automatically varied bight, said attachment comprising a base, a presser bar adapter carrying said base, a foot, a slide beneath the base carrying said foot, a cam to produce a zigzag stitch, a needle bar fork, a pawl and ratchet operated by said fork to drive the zigzag cam, a pattern cam in the form of an elongated bar having feed teeth, feed mechanism engaging said teeth to feed said pattern cam, means whereby the needle bar fork operates the said feed mechanism, said pattern cam having a first cam track and a first cam follower to produce X pattern motion, and having a second cam track and a second cam follower to produce Y pattern motion, and having a third cam track and a third cam follower to automatically vary the bight of the zigzag stitch without varying the X and Y pattern motions, and an additional manually adjustable means to vary the range of the automatic variation produced by the said third cam track.

22. A sewing machine attachment as defined in claim 21, in which there is linkage driven by the zigzag cam, said linkage including a slotted rocker and a shift link extending transversely of and pivoted in the slot of said rocker, and the cam follower of the third cam track has linkage extending transversely of and connected to said shift link for shifting the same along the slot in order to automatically vary the bight of the zigzag stitch, and in which the additional manually adjustable means includes a second slotted rocker and a second shift link extending transversely of and pivoted in said second slot to vary the range of the automatic variation produced by the said cam track.

23. A sewing machine attachment for making monograms and other designs requiring crossover, said attachment comprising a base, a presser bar adapter carrying said base, a foot frame, a slide beneath the base carrying said foot frame, means mounting the slide and foot frame for X and Y pattern motion, a pattern cam with two separate cam tracks and associated mechanism to produce the desired X and Y pattern motions, a needle bar fork, a pawl and ratchet wheel driven by said fork, a zigzag cam driven by said ratchet wheel and linkage operated thereby for producing a zigzag stitch, said pattern cam being an elongated bar having feed teeth, feed mechanism driven by said fork and engaging said teeth to feed said pattern cam, said pattern cam having an additional bight cam track, a cam follower means engaging said bight cam track and connected to the said zigzag linkage to automatically vary the bight of the zigzag stitch without varying the X and Y pattern motions.

24. A sewing machine attachment for making monograms and other designs, as defined in claim 23, in which the bight cam track of the pattern cam bar projects from one edge of the bar near one face of the bar, and in which the attachment receiving the bar includes means matingly shaped to clear the bight cam track to receive the pattern cam bar only when said bar is in proper orientation, thereby polarizing the combination against insertion of the pattern cam bar in improper position.

25. A sewing machine attachment for making monograms and other designs, said attachment comprising a base, a presser bar adapter carrying said base, a foot frame, a slide beneath the base carrying said foot frame, means mounting the slide and foot frame for X and Y motion, a pattern cam with X and Y cam tracks and associated mechanism to produce the desired X and Y motions, means for producing a zigzag stitch including a needle bar fork, a pawl and ratchet wheel driven by said fork, a zigzag cam driven by said ratchet wheel, linkage including a slotted rocker and a shift link extending transversely of and pivoted in said slot of said rocker, said pattern cam being an elongated flat bar having edge teeth, feed mechanism engaging said teeth to feed said pattern cam, means driven by said fork to drive said feed mechanism, said pattern cam having an additional bight cam track and a cam follower and linkage extending transversely of and connected to said shift link for shifting the same along the slot in order to automatically vary the bight of the zigzag stitch without varying the X and Y pattern motions, and an additional manually adjustable means including a second slotted rocker and a second shift link extending transversely of and pivoted in said second slot to vary the range of the automatic variation produced by the said bight cam track.

26. A sewing machine attachment for making monograms and other designs requiring crossover, said attachment comprising a base, a presser bar adapter carrying said base, a foot frame, a slide beneath the base, said foot frame being carried by the forward end of said slide, said slide having a rear longitudinal slot and a cross slot and a second longitudinal slot, means including said rear longitudinal slot and a fixed pivot on the base mounting the slide and foot frame for arcuate X and radial Y motion, a pattern cam in the form of an elongated flat bar having edge teeth for feed and having smooth continuous top and bottom cam tracks, a cam follower for one of said tracks and linkage extending therefrom to said second longitudinal slot in the slide for producing arcuate X motion, a cam follower for the other cam track and linkage from said follower to said cross slot in the slide for producing Y motion, a zigzag cam, a needle bar fork, pawl and ratchet mechanism operated thereby to rotate said zigzag cam, a gear rotated by said pawl and ratchet mechanism meshing with said edge teeth to feed the pattern cam through the attachment past the cam followers, a zigzag cam follower, and linkage so connecting the zigzag cam follower to the linkage of the X cam follower as to combine the zigzag motion and the X motion.

27. A sewing machine attachment for making monograms and other designs requiring crossover, said attachment comprising a base, a presser bar adapter carrying said base, a foot frame, a slide beneath the base, said foot frame being carried by the forward end of said slide, said slide having a rear longitudinal slot and a cross slot and a second longitudinal slot, means including said rear longitudinal slot and a fixed pivot on the base mounting the slide and foot frame for arcuate X and radial Y motion, a pattern cam in the form of an elongated flat bar having teeth for feed and having top and bottom cam tracks, a cam follower for one of said tracks and linkage extending therefrom to said second longitudinal slot in the slide for producing arcuate X motion, a cam follower for the other cam track and linkage from said follower to said cross slot in the slide for producing Y motion, a needle bar fork, pawl and ratchet mechanism operated thereby, feed mechanism operated by said pawl and ratchet mechanism engaging said teeth to feed the pattern cam through the attachment past the cam followers, a zigzag cam, said pawl and ratchet mechanism also driving said zigzag cam, a zigzag cam follower, linkage so connecting the zigzag cam follower to the linkage of the X cam follower as to combine the zigzag motion and the X motion, said pattern cam having an additional bight cam track and a bight cam follower and linkage so connected to the said zigzag linkage as to automatically vary the bight of the zigzag stitch.

28. A sewing machine attachment as defined in claim 27, in which there is an additional manually adjustable means so connected to the zigzag linkage as to vary the range of the automatic variation produced by the said bight cam track.

29. A sewing machine attachment as defined in claim 27, in which the linkage of the zigzag cam follower includes a slotted rocker and a shift link extending transversely of and pivoted in said slot, and in which the bight cam follower has linkage extending transversely of and connected to said shift link for shifting the same along the slot in order to automatically vary the bight of the zigzag stitch.

30. A sewing machine attachment as defined in claim 29, in which there is an additional manually adjustable means including a second slotted rocker and a second shift link extending transversely of and pivoted in said second slot, said second shift link being moved by said manual means to vary the range of the automatic variation produced by the said cam track.

31. A sewing machine attachment as defined in claim 27 for making monograms and other designs, in which said flat pattern cam bar has a start mark and has a top cam groove for producing X motion and has a bottom cam groove for producing Y motion, said grooves each having a wide convergent mouth for easy entry of a mating cam follower, and in which there is a start pointer on said attachment cooperating with said start mark on the pattern cam, and a manually operable knob on said attachment operatively connected to the said cam bar feed mechanism in order to facilitate manual feed of the pattern cam to the desired starting point where the said start mark is at the said start pointer.

32. A sewing machine attachment for making monograms and other designs, as defined in claim 27, in which there is a ratchet wheel and cooperating pawl, and gearing turned thereby to feed the pattern cam, and in which there is a release lever and means operated by said release lever which releases the pawl and the bight cam follower in order to permit reverse movement of the pattern cam when desired.

33. A sewing machine attachment for making monograms and other designs, as defined in claim 27, in which the bight cam track of the pattern cam bar projects from one edge of the bar near one face of the bar, and in which the attachment receiving the bar includes means matingly shape to clear the bight cam track to receive the pattern cam bar only when said bar is in proper orientation, thereby polarizing the combination against insertion of the pattern cam bar in improper position.

34. A pattern cam bar for use in a sewing machine for making monograms and other designs, said bar being an elongated flat bar having teeth, and having a smooth continuous cam groove formed in one face of said bar for producing positive two-way pattern motion in one direction, and having another smooth continuous cam groove formed in the opposite face of said bar for producing positive two way pattern motion in another direction transverse to the first direction, the location of said cam grooves on opposite faces of said bar affording cam grooves which each may utilize substantially the full width of the bar and which may cross one another, and an additional bight cam track for automatically varying the bight of a zigzag stitch produced by the sewing machine.

35. A pattern cam bar for use in a sewing machine for making monograms and other designs, said bar being an elongated flat bar having teeth, and having a smooth continuous cam groove formed in one face of said bar for producing pattern motion in one direction, and having another smooth continuous cam groove formed in the opposite face of said bar for producing pattern motion in another direction transverse to the first direction, the location of said cam grooves on opposite faces of said bar affording cam grooves which each may utilize substantially the full width of the bar and which may cross one another, and an additional bight cam track for automatically varying the bight of a zigzag stitch produced by the sewing machine, the entrant end of each cam groove having a wide convergent mouth.

36. A pattern cam bar for use in a sewing machine for making monograms and other designs, said bar being an elongated flat bar having edge teeth, said bar having a smooth continuous cam groove formed in the top of said bar for producing pattern motion in one direction, said bar having another smooth continuous cam groove formed in the bottom face of said bar for producing pattern motion in another direction transverse to the first direction, and said bar having an additional bight cam track along one edge of said bar near one face of said bar for automatically varying the bight of a zigzag stitch produced by the sewing machine, said bight cam track serving also as a polarizing means for preventing improper insertion of said bar in the machine receiving the same.

37. A pattern cam bar for use in a sewing machine for making monograms and other designs, said bar being an elongated flat molded plastics bar having edge teeth on both edges, said bar having a smooth continuous cam groove in the top face of said bar for producing pattern motion in one direction, and having another smooth continuous cam groove in the bottom face of said bar for producing pattern motion in another direction transverse to the first direction, and having an additional bight cam track along one edge of said bar near one face of said bar for automatically varying the bight of a zigzag stitch produced by the sewing machine, the entrant end of each cam groove having a wide convergent mouth, said bar having a transverse start mark thereon and further carrying an indication of the design to be produced thereby, said bight cam track serving also to polarize the bar against improper insertion in the sewing machine.

References Cited

UNITED STATES PATENTS

| | | | |
|---|---|---|---|
| 1,575,285 | 3/1926 | Sibbald et al. | 112—102 |
| 2,573,146 | 10/1951 | Johnson | 112—77 |
| 2,828,704 | 4/1958 | Enos | 112—160 |
| 2,907,290 | 10/1959 | Burgess et al. | |
| 3,039,412 | 6/1962 | Kodera et al. | 112—77 X |
| 3,051,106 | 8/1962 | Caldwell et al. | 112—77 |
| 3,168,064 | 2/1965 | Fresard et al. | 112—102 |
| 3,205,844 | 9/1965 | Kodera | 112—77 X |

JORDAN FRANKLIN, *Primary Examiner.*

H. H. HUNTER, *Assistant Examiner.*